(12) United States Patent
Noh

(10) Patent No.: US 9,255,431 B2
(45) Date of Patent: Feb. 9, 2016

(54) OPENING/CLOSING ASSISTING APPARATUS OF GATE FOR TRUCK

(71) Applicant: Hyundai Motor Company, Seoul (KR)

(72) Inventor: Woon-Seog Noh, Siheung-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/500,843

(22) Filed: Sep. 29, 2014

(65) Prior Publication Data

US 2015/0130208 A1 May 14, 2015

(51) Int. Cl.
*B62D 33/00* (2006.01)
*E05F 1/12* (2006.01)
*B62D 33/03* (2006.01)

(52) U.S. Cl.
CPC ............... *E05F 1/1292* (2013.01); *B62D 33/03* (2013.01); *E05Y 2900/516* (2013.01); *E05Y 2900/544* (2013.01)

(58) Field of Classification Search
CPC ........... E05F 1/06; E05F 1/1292; B62D 33/03
USPC ................................................... 296/50, 57.1
See application file for complete search history.

(56) References Cited

U.S. PATENT DOCUMENTS

| | | | | |
|---|---|---|---|---|
| 4,165,121 A | * | 8/1979 | Hori | B62D 33/0273 16/401 |
| 5,271,652 A | * | 12/1993 | Watanabe | B62D 33/03 105/378 |
| 7,547,055 B2 | * | 6/2009 | Stratten | B62D 33/0273 296/57.1 |
| 2004/0032141 A1 | * | 2/2004 | Moyna | B60P 1/26 296/50 |
| 2009/0108613 A1 | | 4/2009 | Krajenke | |

FOREIGN PATENT DOCUMENTS

| | | |
|---|---|---|
| JP | 2004-1768 A | 1/2004 |
| JP | 3687729 B2 | 6/2005 |
| JP | 2005-289186 A | 10/2005 |
| KR | 10-2004-0086148 A | 10/2004 |
| KR | 10-2005-0051335 A | 6/2005 |

* cited by examiner

*Primary Examiner* — Joseph D Pape
*Assistant Examiner* — Dana Ivey
(74) *Attorney, Agent, or Firm* — Morgan, Lewis & Bockius LLP

(57) ABSTRACT

An apparatus for assisting opening/closing of a gate for a truck may include a housing mounted onto a lower side of the floor panel, a lifter having a first end pivotally coupled to the floor, wherein the lifter generates elastic repulsive force when being compressed while a length of the lifter is decreased, a first arm having a first end pivotally connected to a second end of the lifter, a second arm having a first end pivotally mounted on the housing and a second end pivotally connected to a second end of the first arm, and a third arm having a first end pivotally connected to a third end of the second arm and a second end pivotally connected to the gate, wherein when the gate rotates downwardly and is opened, the first arm, the second arm, and the third arm are moved to compress the lifter.

7 Claims, 6 Drawing Sheets

EXTERNAL SIDE ←→ INTERNAL SIDE

OPENING/CLOSING ASSISTING APPARATUS OF GATE FOR TRUCK

CROSS-REFERENCE TO RELATED APPLICATIONS

The present application claims priority to Korean Patent Application No. 10-2013-135354, filed Nov. 8, 2013, the entire contents of which is incorporated herein for all purposes by this reference.

BACKGROUND OF THE INVENTION

1. Field of the Invention

The present invention relates to an opening/closing assisting apparatus of a gate for a truck, and more particularly, to an opening/closing assisting apparatus of a gate for a truck, which may be further minimized, and more efficiently suppress generation of failure due to inflow of contaminant substances by adopting a structure in which a lifter generating repulsive force is built in a housing.

2. Description of Related Art

A truck carrying cargo is provided with a space, in which cargo may be loaded, in a rear side of a driver's seat.

Various types of trucks are produced according to the type and weight of cargo, and among them, in a truck provided with a load space having no roof, gates 1 are mounted to be vertically erected at both sides and a rear side of a flat floor panel 2 as illustrated in FIG. 1.

The gates 1 prevent the cargo from falling down when being vertically erected (closed), but are rotatable from the floor panel 2 to be rotated downwardly (rotated in a counterclockwise direction in FIGS. 1A and 1B) and be opened in order to easily offload the cargo.

In the case of a large truck, a separate power system is additionally mounted, so that opening/closing of the gates 1 are performed by oil pressure or air pressure, but in the case of a small truck, opening/closing of the gates 1 are generally performed manually by a worker.

However, weight of the gates 1 formed of a steel material is not light, so that an opening/closing assisting apparatus is additionally mounted in order to decrease weight when the gates 1 are lifted up to be closed. That is, weight of the gate 1 of a small truck is about 25 kg or more, which may incur musculoskeletal disease to a worker according to the number of times of opening/closing. Accordingly, in order to prevent the incurrence of the disease, and prevent a vehicle and a worker from being damaged by suppressing free fall when the gates 1 are opened, the opening/closing assisting apparatus is mounted.

The opening/closing assisting apparatus in the related art is configured in such a manner that a plurality of link arms 3, 4, 5, and 6 are connected to an external side of the gate 1 and a lower side of the floor panel 2 to be linked and moved, and a coil spring 7 elastically compressed when the gate 1 is opened (the gate 1 is rotated to move down) is connected to the link arms 3, 4, 5, and 6, so that elastic force of the coil spring 7 assists a rotation of the gate when the gate 1 is closed (vertically erected as illustrated in FIGS. 1A and 1B).

In the opening/closing assisting apparatus in the related art, the coil spring 7 is exposed to the outside, so that there is a problem in that the coil spring 7 may be contaminated by soil or dust, and the coil spring 7 and the link arms 3, 4, 5, and 6 are connected long in a row, so that there is a problem in an increase in a space for installation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an opening/closing assisting apparatus of a gate for a truck, which is configured to suppress a possibility in contamination due to an external factor, be further minimized and thus decrease an installation space, and decrease weight.

In an aspect of the present invention, an apparatus for assisting opening/closing of a gate for a truck, which assists opening/closing of the gate pivotally mounted to an end of a floor panel of the truck, may include a housing mounted onto a lower side of the floor panel, a lifter having a first end pivotally coupled to the floor, wherein the lifter generates elastic repulsive force when being compressed while a length of the lifter is decreased, a first arm having a first end which is pivotally connected to a second end of the lifter, a second arm having a first end pivotally mounted on the housing and a second end pivotally connected to a second end of the first arm, and a third arm having a first end pivotally connected to a third end of the second arm and a second end pivotally connected to the gate that is pivotally connected to the floor panel, wherein when the gate rotates downwardly and is opened, the first arm, the second arm, and the third arm are moved to compress the lifter.

The lifter is mounted in the housing.

The apparatus may further include a guide arm having a first end pivotally connected to the first arm and a second end pivotally connected to the housing, to guide a movement of the first arm.

The first arm is provided with a seating hole in a longitudinal direction thereof, and the lifter is positioned in the seating hole.

The lifter is a gas lifter inside which gas is sealed to generate the elastic repulsive force while the length of the lifter is decreased and thus the gas is compressed.

According to various embodiments of the present invention, the lifter is disposed to be built in the housing, so that it is possible to easily mount the apparatus to a vehicle body, and prevent failure due to external contaminant substances, compared to an opening/closing assisting apparatus in the related art.

The lifter is mounted to the seating hole of the first arm to be configured to be shorter than a structure in the related art, and elastic force is generated by pressure of gas, so that it is possible to set more flexibly opening/closing assisting force by adjusting the pressure of the gas according to weight of the gate.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings,

Figure 1A:
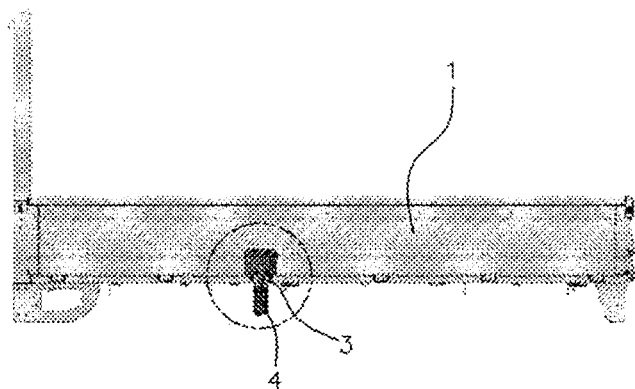
FIG. 1A and FIG. 1B are cross-sectional views illustrating an opening/closing assisting apparatus mounted to a gate and a floor panel of a truck in the related art.
Figure 1B:
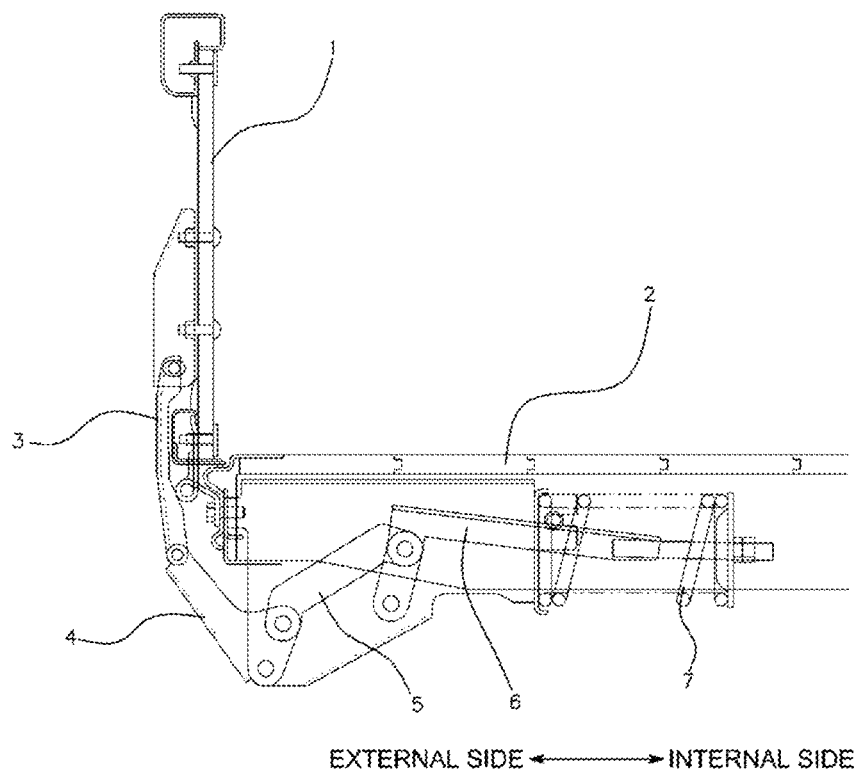

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to an opening/closing assisting apparatus of a gate for a truck, which assists opening/closing of gates 1 mounted to be rotated at ends of a floor panel 2 of a truck, and the opening/closing assisting apparatus of the present invention includes a housing 50, a lifter 40, and a plurality of arms which are linked and moved according to the rotation of the gate 1.

Figure 2:
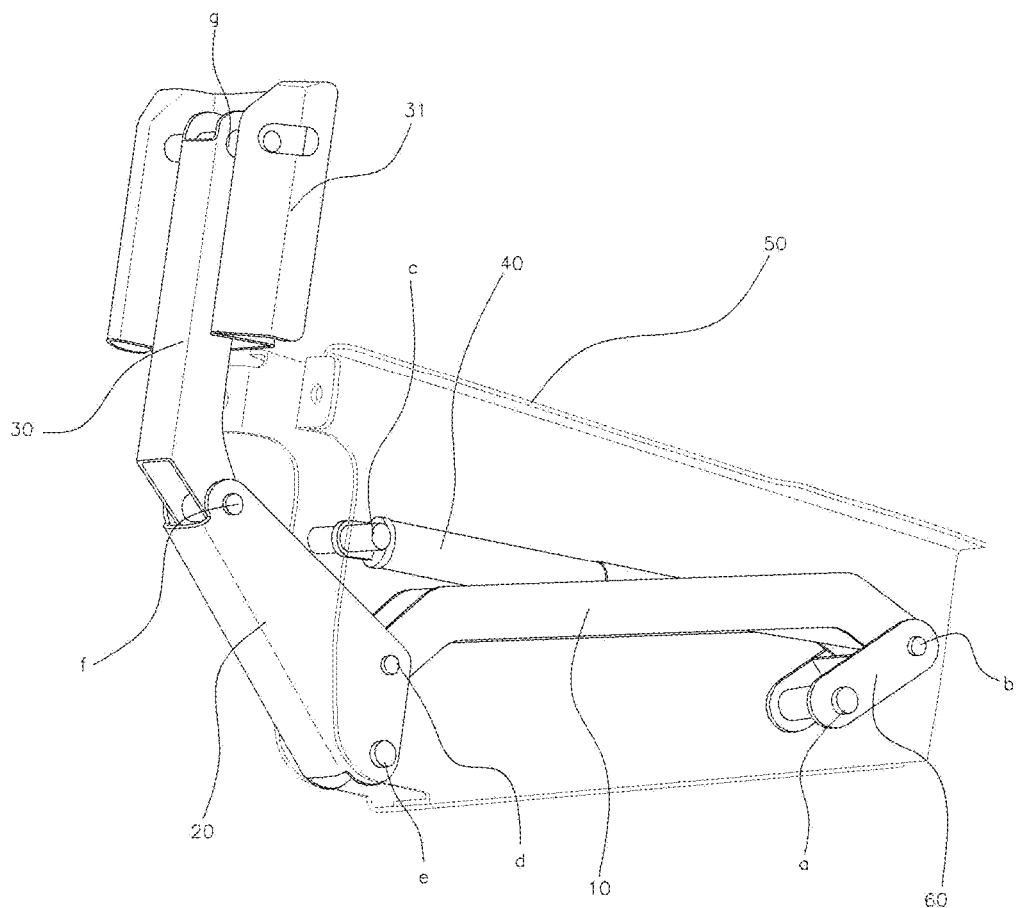
FIG. 2 is a perspective view illustrating a state of an internal side of a housing of an exemplary opening/closing assisting apparatus of a gate for a truck according to an exemplary embodiment of the present invention.
Figure 3:
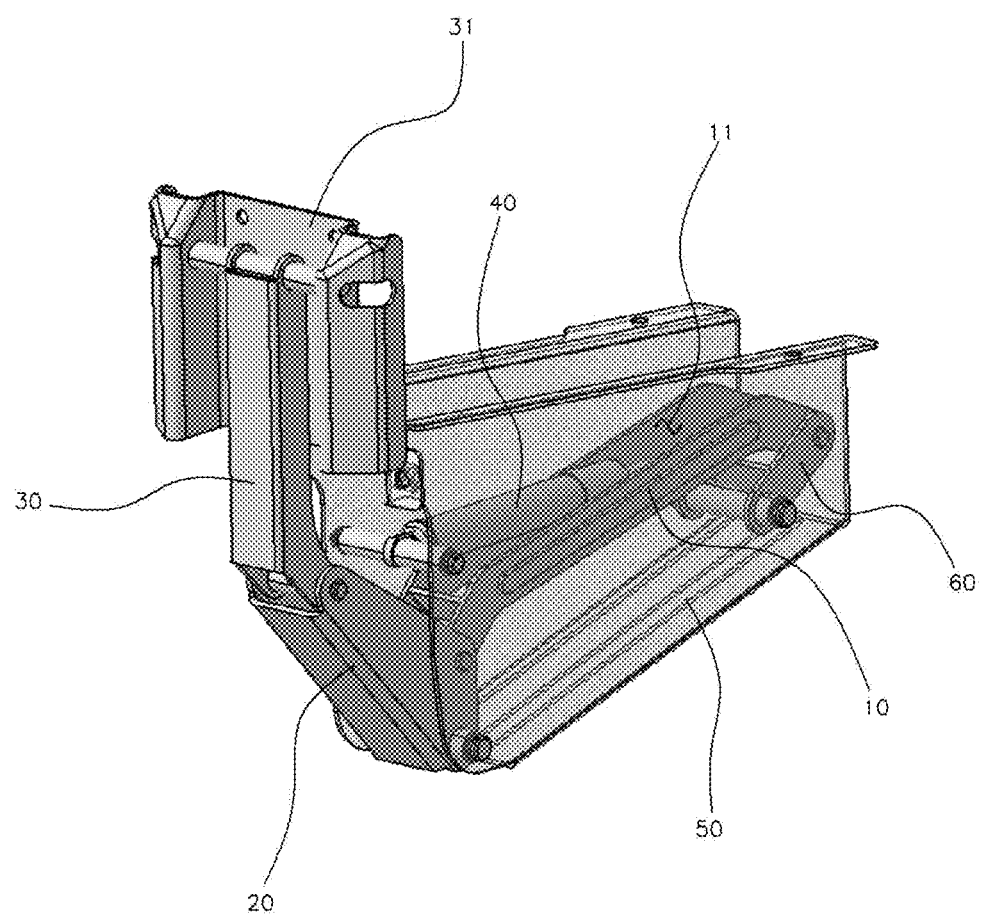
FIG. 3 is a perspective view illustrating a portion at which a seating hole is formed at a first arm in the exemplary opening/closing assisting apparatus of FIG. 2 according to an exemplary embodiment of the present invention.
Figure 4:
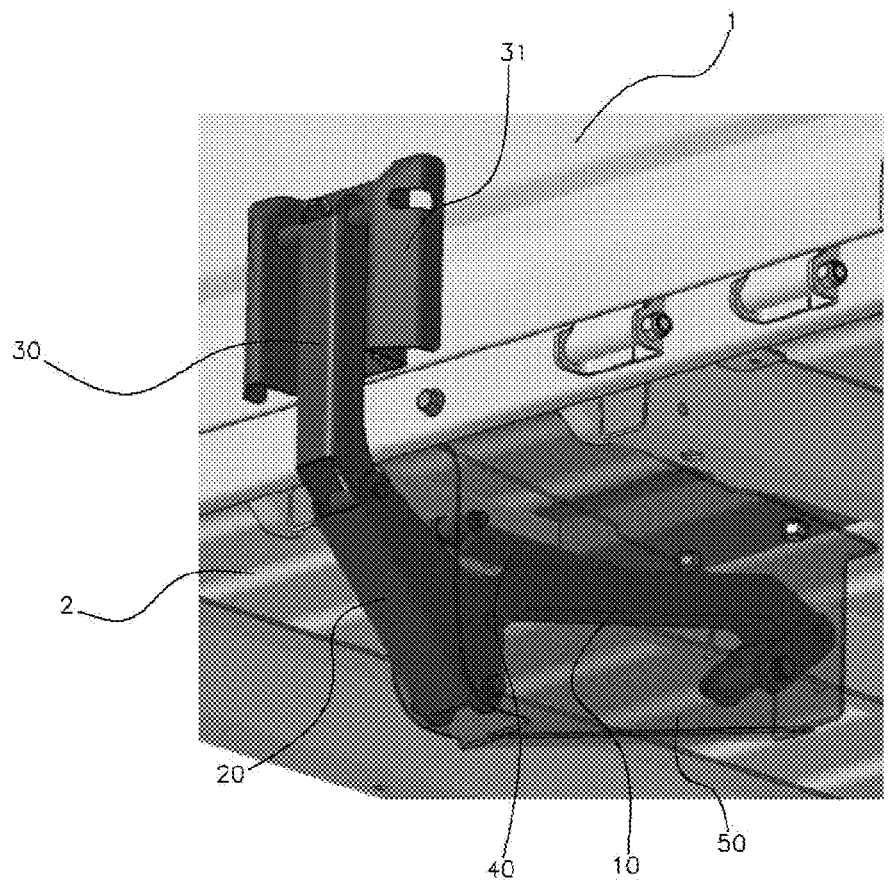
FIG. 4 is a view illustrating a state where the exemplary opening/closing assisting apparatus of FIG. 2 is mounted on the gate and the floor panel of the truck according to an exemplary embodiment of the present invention.

Referring to FIG. 2, FIG. 3 and FIG. 4, the housing 50 of the present invention has a structure, in which a predetermined space is formed inside the housing 50, and the housing is fixedly mounted onto a lower surface of the floor panel 2. The lifter 40 is mounted inside the housing 50, and one end of the lifter 40 is rotatably mounted at point c of the housing 50, and the lifter 40 generates elastic repulsive force when the lifter 40 is compressed so that a length thereof is decreased.

In various exemplary embodiments of the present invention, the lifter 40 is implemented by a gas lifter, inside which a predetermined amount of gas is sealed, so that elastic repulsive force is generated by compression of the gas.

The other end of the lifter 40 is rotatably connected to a first arm 10 at point b, and the first arm 10 is rotatably connected to a second arm 20 at point d. Further, the second arm 20 is rotatably mounted to the housing 50 at point e, and is rotatably connected to a third arm 30 at point f. The third arm 30 is rotatably connected to a bracket 31 fixed to the gate 1 at point g.

When the gate 1 is rotated downwardly to be opened, the first arm 10, the second arm 20, and the third arm 30 are continuously linked and moved, and thus the lifter 40 is compressed so that the length thereof is decreased.

Various aspects of the present invention may further include a guide arm 60 to guide the linked movement of the first arm 10. The guide arm 60 is rotatably connected to the housing 50 at point a, and is rotatably connected to the first arm 10 and the lifter 40 at point b.

As illustrated in FIG. 3, a seating hole 11 is formed in the first arm 10 in a longitudinal direction, and the lifter 40 is disposed to enter the seating hole 11, so that the lifter 40 and the first arm 10 are disposed to overlap to decrease a mounting space.

Figure 5A:
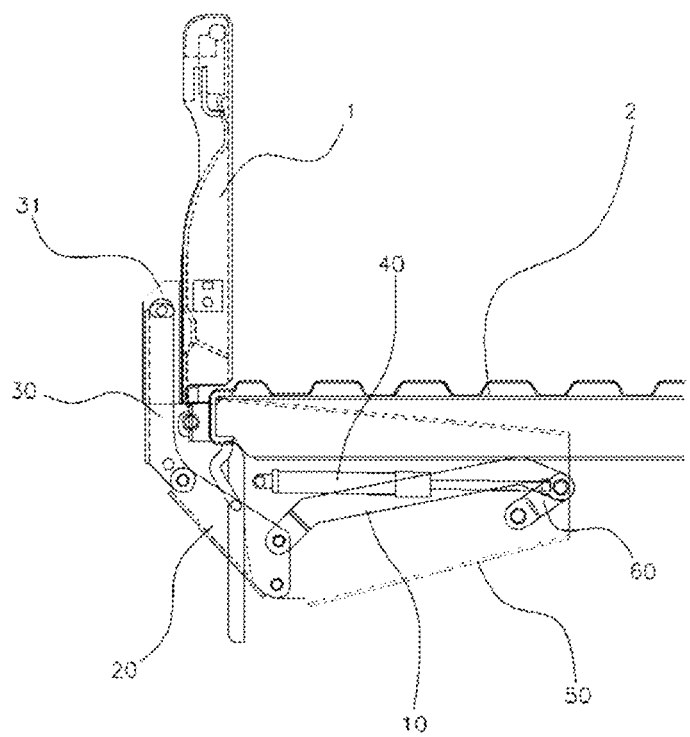
FIG. 5A, FIG. 5B and FIG. 5C are views illustrating a state where arms and a lifter of the exemplary opening/closing assisting apparatus are linked and moved according to an opening angle of the gate according to an exemplary embodiment of the present invention.
Figure 5B:
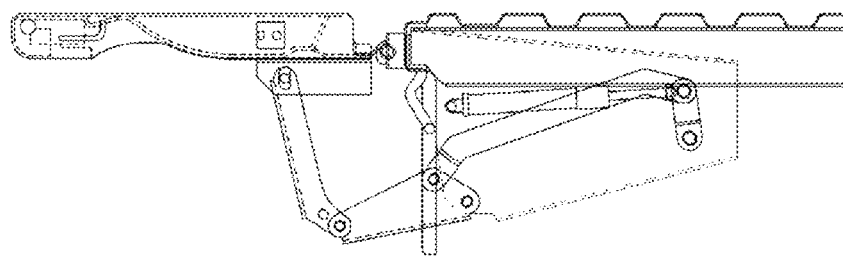
Figure 5C:
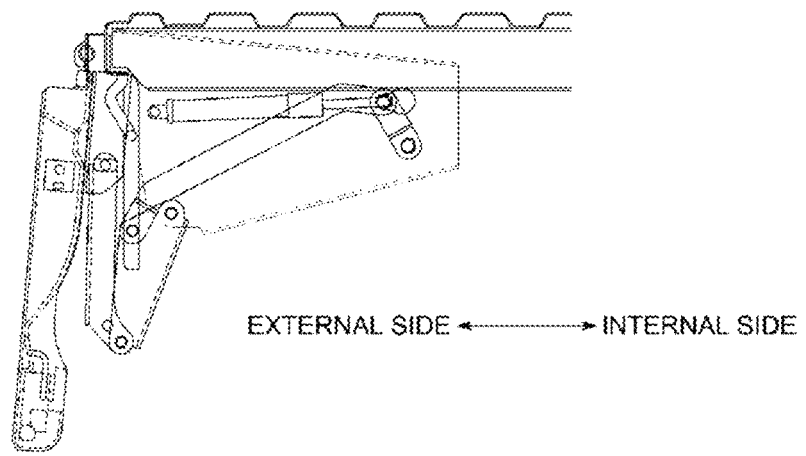

As illustrated in FIGS. 5A-5C, a state where the gate 1 is closed is a state where the inside gas pressure of the lifter 40 is the lowest, so that the lifter 40 is maintained in a maximally extended state (FIG. 5A), and when an opening of the gate 1 progresses, the lifter 40 is gradually compressed (FIG. 5B), and when the gate 1 is completely opened, the lifter 40 becomes a maximally compressed state (FIG. 5C) (FIG. 5A, the state where an opening angle of the gate is 0°, FIG. 5B, the state where an opening angle of the gate is 90°, FIG. 5C, the state where an opening angle of the gate is 176°).

The opening/closing assisting apparatus of the gate for the truck of various embodiments of the present invention, including the aforementioned configurations has a structure in which the bracket 31 and the third arm 30 are moved together according to the rotation of the gate 1 to rotate the second arm 20, and thus the first arm 10 and the guide arm 60 are rotated in linkage with the second arm 20 and the lifter 40 is simultaneously compressed. Accordingly, the structure is relatively simple, so that it is possible to easily manufacture and install the opening/closing assisting apparatus, and the lifter 40 is disposed inside the housing 50, so that the opening/closing assisting apparatus may be minimized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for assisting opening/closing of a gate for a truck, which assists opening/closing of the gate pivotally mounted to an end of a floor panel of the truck, the apparatus comprising:
    a housing mounted onto a lower side of the floor panel;
    a lifter having a first end pivotally coupled to the housing, wherein the lifter generates elastic repulsive force when being compressed while a length of the lifter is decreased;
    a first arm having a first end which is pivotally connected to a second end of the lifter;
    a second arm having a first end pivotally mounted on the housing and a second end pivotally connected to a second end of the first arm; and
    a third arm having a first end pivotally connected to a third end of the second arm and a second end pivotally connected to the gate that is pivotally connected to the floor panel,
    wherein when the gate rotates downwardly and is opened, the first arm, the second arm, and the third arm are moved to compress the lifter.

2. The apparatus of claim 1, wherein the lifter is mounted in the housing.

3. The apparatus of claim 1, further comprising a guide arm having a first end pivotally connected to the first arm and a second end pivotally connected to the housing, to guide a movement of the first arm.

4. The apparatus of claim 1, wherein the first arm is provided with a seating hole in a longitudinal direction thereof, and the lifter is positioned in the seating hole.

5. The apparatus of claim 3, wherein the first arm is provided with a seating hole in a longitudinal direction thereof, and the lifter is positioned in the seating hole.

6. The apparatus of claim 4, wherein the lifter is a gas lifter inside which gas is sealed to generate the elastic repulsive force while the length of the lifter is decreased and thus the gas is compressed.

7. The apparatus of claim 5, wherein the lifter is a gas lifter inside which gas is sealed to generate the elastic repulsive force while the length of the lifter is decreased and thus the gas is compressed.

* * * * *

UNITED STATES PATENT AND TRADEMARK OFFICE
CERTIFICATE OF CORRECTION

| | | |
|---|---|---|
| PATENT NO. | : 9,255,431 B2 | Page 1 of 1 |
| APPLICATION NO. | : 14/500843 | |
| DATED | : February 9, 2016 | |
| INVENTOR(S) | : Woon-Seog Noh | |

It is certified that error appears in the above-identified patent and that said Letters Patent is hereby corrected as shown below:

On the Title page, please insert the following foreign application data:

-- (30) Foreign Application Priority Data:

Nov. 8, 2013 (KR) ........................... 10-2013-135354 --.

Signed and Sealed this
Tenth Day of May, 2016

Michelle K. Lee
*Director of the United States Patent and Trademark Office*